United States Patent [19]
Stretanski

[11] 3,932,324
[45] Jan. 13, 1976

[54] LIGHT STABILIZER COMPOSITIONS FOR POLYMERS

[75] Inventor: Joseph Anthony Stretanski, Clinton, N.J.

[73] Assignee: American Cyanamid Company, Stamford, Conn.

[22] Filed: June 13, 1974

[21] Appl. No.: 479,017

[52] U.S. Cl.............................260/23 H; 260/45.75 N; 260/45.9 NC; 252/401
[51] Int. Cl.$^2$........................................... C08G 6/00
[58] Field of Search... 260/45.9 NC, 45.75 N, 23 H; 252/401

[56] References Cited
UNITED STATES PATENTS

| | | | |
|---|---|---|---|
| 3,639,518 | 2/1972 | Davies et al. | 260/23 |
| 3,790,517 | 2/1974 | Koizumi et al. | 260/45.9 |
| 3,803,065 | 4/1974 | Arai et al. | 260/23 |

Primary Examiner—V. P. Hoke
Attorney, Agent, or Firm—Philip Mintz

[57] ABSTRACT

Nickel amine, nickel aquo, and nickel bis- complexes of 2,2'-thiobis(p-alkylphenol), used to stabilize materials against degradation by ultraviolet radiation, are stabilized against thermal degradation by use of a hydroxyalkylamide of the formula:

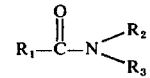

wherein
$R_1$ is alkyl or aryl;
$R_2$ is hydroxyalkyl of 2 to 4 carbon atoms; and
$R_3$ is hydrogen or hydroxyalkyl of 2 to 4 carbon atoms.

11 Claims, No Drawings

LIGHT STABILIZER COMPOSITIONS FOR POLYMERS

This invention relates to stabilizing nickel amine, nickel aquo, and nickel bis-complexes of 2,2'-thiobis(p-alkylphenols) against thermal degradation. More particularly, it relates to doing so by use of certain N-hydroxyalkylamides.

Nickel amine, nickel aquo, and nickel bis- complexes of 2,2'-thiobis(p-alkylphenols) are well known and widely used to stabilize polymers against degradation by ultraviolet radiation. The nickel amine complexes, which are characterized by a single nitrogen-to-nickel coordinate bond and a single nickel-to-sulfur coordinate bond for each nickel atom in the complex molecule, may be represented by the formula:

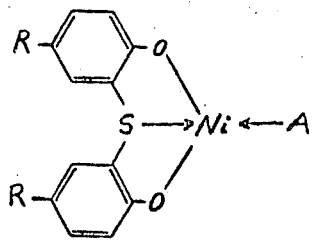

wherein each R is an alkyl group of 1 to 18 carbon atoms and A is a member selected from the group consisting of primary aliphatic amines, primary aromatic amines, and cyclic secondary amines. Foster U.S. Pat. Nos. 3,215,717 and 3,313,770 discloses many of these complexes wherein A is an amine. As disclosed in Stretanski et al. U.S. Pat. No. 3,816,492, a preferred nickel amine complex is the one wherein the primary aliphatic amine is cyclohexylamine. The nickel aquo complexes may also be represented by the same formula wherein A is water. These nickel aquo complexes are also disclosed in said Foster patents. The nickel bis-complexes, which are characterized by two nickel-to-sulfur coordinate bonds for each nickel atom in the complex molecule, may be represented by the formula:

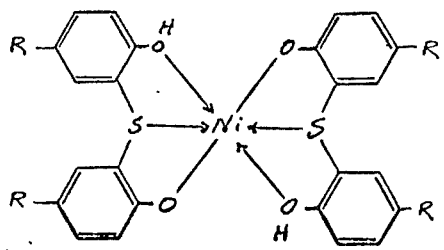

wherein each R is an alkyl group of 1 to 18 carbon atoms. These nickel bis-complexes are disclosed in Fuchsman et al. U.S. Pat. Nos. 2,971,940 and 2,971,941.

As disclosed in the aforesaid references, these complexes are all very effective for stabilizing polymers against degradation on exposure to ultraviolet radiation and they serve to provide dye-sites for nickel-chelatable dyes. Illustrative of the polymers wherein these complexes may be used are polyolefins such as polyethylene and polypropylene, acrylonitrilebutadiene-styrene polymers, polystyrene, polycarbonates, polyamides such as nylon, and the like. In such uses, typically the complex is blended with the polymer in the desired proportion, conventionally from about 0.01 to about 5 percent, preferably from about 0.2 to about 2 percent, based on weight of polymer, and the blend is then molded to form a finished article, as by injection molding, extruding, blow-molding, and fiber spinning. Since these molding processes normally involve the use of elevated temperatures, the complex used is subjected to conditions causing thermal degradation of the complex. Although the nickel cyclohexylamine complex is much more resistant to thermal degradation than the other nickel amine or nickel aquo complexes, as disclosed in the aforesaid references, all these complexes tend to degrade on exposure to heat leading to discoloration of the polymer containing them and shade changes when such polymers are dyed.

In accordance with the present invention, it has now been found that the resistance to thermal degradation of all these nickel amine, nickel aquo, and nickel bis-complexes can be remarkably improved by the presence in the polymer containing such complexes of a hydroxyalkylamide of the formula:

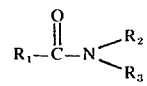

wherein $R_1$ is alkyl or aryl; $R_2$ is hydroxyalkyl of 2 to 4 carbon atoms; and $R_3$ is hydrogen or hydroxyalkyl of 2 to 4 carbon atoms. Preferably, $R_2$ is a 2-hydroxyethyl and $R_3$ is hydrogen or 2-hydroxyethyl. These hydroxyalkylamides can be prepared by reacting the appropriate acyl chloride with the appropriate mono- or dialkanol amine in the presence of an acid acceptor, a well-known reaction for such preparations.

Illustrative of such hydroxyalkylamides are the N-(2-hydroxyethyl), N-(2-hydroxypropyl), N,N-bis(2-hydroxyethyl), and N,N-(2-hydroxypropyl) substituted caproamide, caprylamide, lauramide, stearamide, behenamide, benzamide, naphthamide, anisamide, 4-hydroxy-3,5-di-t-butylbenzamide, toluamide, xylamide, etc. Such hydroxyalkylamide will usually be used in a concentration of about 5 to about 100 percent, preferably from about 10 to about 75 percent by weight based on weight of nickel complex. The exact concentration chosen will, of course, be a function of several variables, such as the highest temperature to which the polymer containing the nickel amine, nickel aquo, or nickel bis- complex will be exposed, the amount of time of such exposure, the amount of discoloration which can be tolerated for those uses where the absolute minimum of discoloration is not absolutely necessary, etc.

These hydroxyalkylamides may be incorporated into the polymer in any manner, either before, with, or after the nickel complex is incorporated therein. A preferred manner is to pre-blend the nickel complex with the hydroxyalkylamide and then to mix these blended additives with the polymer. When this is done, the blend will contain these two additives in the desired proportion for use.

The nickel complex and the hydroxyalkylamide are advantageously used in the polymer substrates in combination with other additives or secondary stabilizers such as ultraviolet light absorbers, dyes, pigments, hindered phenol antioxidants, lubricants, secondary stabilizers such as dilauryl- and di-stearyl-thiodipropionates, etc. Illustrative of the ultraviolet light absorbers are those mentioned in column 3, lines 14–55 of Bright U.S. Pat. No. 3,636,022 and column 4, lines 1–17 of Murray et al. U.S. Pat. No. 3,636,023.

The effectiveness of the hydroxyalkylamides in protecting the nickel complexes in polymers in accordance with this invention can be evaluated in a number of ways. The heat stability of these new compositions can be determined by dry blending with a polymer followed by milling. A milled sheet can then be cut into strips which are inserted into a Melt Index Apparatus set at 290°C. An extrudate can be removed at regular intervals in order to obtain a color profile for each composition. The discoloration of the extrudates upon aging is given a numerical rating, each number above zero indicating a degree of discoloration:

0 — no change
1 — yellow-green
2 — slightly gray-green
3 — tan-green
4 — brown-green
5 — gray-green
6 — brown
7 — gray
8 — dark brown
9 — black The invention is further illustrated by the following examples.

EXAMPLE I

50 Grams of unstabilized polypropylene powder (Hercules Profax 6401) was dry blended with 0.5 gram of the nickel n-butylamine complex of 2,2'-thiobis(p-t-octylphenol), 0.1 gram of the indicated amide, and 0.1 gram of 2,4,6-tri-t-butylphenol as a processing antioxidant. The blended mixture was milled on a standard plastic mill at 175°C. The milled samples were cut into strips and inserted into a Melt Index Apparatus at 290°C. and an extrudate removed every minute for 15 minutes in order to obtain a thermal discoloration profile for each composition, each extrudate being assigned a numerical color rating from 0–9 as described above. This data is reported in Table I.

Table I

Color Rating of Polypropylene Containing 1% Nickel n-Butylamine Complex of 2,2'-Thiobis-(p-t-octylphenol) Plus 0.2% of Indicated Amide

| Sample Description* | Minutes Aging at 290°C. | | | | |
|---|---|---|---|---|---|
| | 2 | 5 | 7 | 10 | 13 | 15 |
| 1% NBC alone | 0 | 4 | 6 | 8 | 9 | 9 |
| 1% NBC + 0.2% A | 0 | 2 | 2 | 2 | 2 | 2 |
| 1% NBC + 0.2% B | 0 | 0 | 0 | 0 | 1 | 1 |
| 1% NBC + 0.2% C | 0 | 0 | 0 | 0 | 1 | 1 |
| 1% NBC + 0.2% D | 0 | 0 | 0 | 0 | 1 | 1 |
| 1% NBC + 0.2% E | 0 | 1 | 1 | 1 | 2 | 5 |
| 1% NBC + 0.2% F | 0 | 1 | 1 | 1 | 1 | 1 |
| 1% NBC + 0.2% G | 1 | 4 | 6 | 8 | 9 | 9 |
| 1% NBC + 0.2% H | 1 | 4 | 6 | 8 | 9 | 9 |
| 1% NBC + 0.2% J | 0 | 2 | 5 | 7 | 9 | 9 |
| 1% NBC + 0.2% K | 0 | 4 | 6 | 8 | 9 | 9 |
| 1% NBC + 0.2% L | 0 | 3 | 4 | 6 | 8 | 9 |
| 1% NBC + 0.2% M | 0 | 3 | 6 | 8 | 8 | 9 |
| 1% NBC + 0.2% N | 0 | 4 | 6 | 8 | 8 | 9 |

Table I-continued

Color Rating of Polypropylene Containing 1% Nickel n-Butylamine Complex of 2,2'-Thiobis-(p-t-octylphenol) Plus 0.2% of Indicated Amide

| Sample Description* | Minutes Aging at 290°C. | | | | |
|---|---|---|---|---|---|
| | 2 | 5 | 7 | 10 | 13 | 15 |
| 1% NBC + 0.2% P | 0 | 4 | 6 | 8 | 8 | 9 |

*NBC is nickel n-butylamine complex of 2,2'-thiobis(p-t-octylphenol)
A is N,N-bis(2-hydroxyethyl)benzamide
B is N,N-bis(2-hydroxyethyl)lauramide
C is N,N-bis(2-hydroxyethyl)stearamide
D is N,N-bis(2-hydroxyethyl)caproamide
E is N,N-bis(2-hydroxypropyl)caproamide
F is N-(2-hydroxyethyl)lauramide
G is N-(n-octyl)-3,5-di-t-butyl-4-hydroxybenzamide
H is N,N-bis(n-butyl)-3,5-di-t-butyl-4-hydroxybenzamide
J is N-(2-hydroxyethyl)formamide
K is 2,4-bis(2-hydroxyethyl)-5,5-dimethylhydantoin
L is N,N'-methylenebisacrylamide
M is N,N-dimethylstearamide
N is tris(2-hydroxyethyl)isocyanurate
P is N-(hydroxymethyl)behenamide The data in Table I clearly indicate the superior resistance to thermal degradation in polypropylene of the nickel amine complex when stabilized with hydroxyalkylamides of the formula

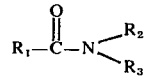

wherein $R_1$ is alkyl or aryl; $R_2$ is hydroxyalkyl of 2 to 4 carbon atoms; and $R_3$ is hydrogen or hydroxyalkyl of 2 to 4 carbon atoms (compounds A through F) in accordance with this invention as compared with numerous other closely related amides.

EXAMPLE II

The procedure of Example I was followed except that the nickel aquo complex of 2,2'-thiobis(p-t-octylphenol) was used instead of the nickel n-butylamine complex. The color ratings of these samples are reported in Table II.

Table II

Color Rating of Polypropylene Containing 1% Nickel Aquo Complex of 2,2'-Thiobis-(p-t-octylphenol) Plus 0.2% of Indicated Amide

| Sample Description* | Minutes Aging at 290°C. | | | | |
|---|---|---|---|---|---|
| | 2 | 5 | 7 | 10 | 13 | 15 |
| 1% NAC alone | 0 | 0 | 2 | 5 | 5 | 7 |
| 1% NAC + 0.2% C | 0 | 0 | 0 | 2 | 2 | 2 |
| 1% NAC + 0.2% F | 0 | 0 | 0 | 0 | 2 | 2 |
| 1% NAC + 0.2% L | 0 | 1 | 1 | 1 | 3 | 3 |
| 1% NAC + 0.2% M | 0 | 0 | 2 | 5 | 5 | 5 |

*NAC is nickel aquo complex of 2,2'-thiobis(p-t-octylphenol)
C, F, L, and M are as defined below Table I, supra.

The data in Table II clearly indicate the superior resistance to thermal degradation in polypropylene of the nickel aquo complex when stabilized with hydroxyalkylamides in accordance with the present invention although some, but not all, other amides do provide useful protection.

The mixtures of nickel aquo complex and hydroxyalkylamide can be prepared by merely admixing or by azeotroping water from an equimolar mixture thereof.

Example III

The procedure of Example I was followed except that the nickel phenol-phenolate of 2,2'-thiobis(p-t-octylphenol), a nickel bis-complex sold by Ferro Corporation as AM—101, was used instead of the nickel n-butylamine complex. The color ratings of these samples are reported in Table III.

Table III

Color Rating of Polypropylene Containing 1% Nickel Phenol-Phenolate of 2,2'-Thiobis(p-t-octylphenol) Plus 0.2% of Indicated Amide

| Sample Description* | Minutes Aging at 290°C. | | | | |
|---|---|---|---|---|---|
| | 2 | 5 | 7 | 10 | 13 |
| 1% AM-101 alone | 1 | 6 | 8 | 9 | 9 |
| 1% AM-101 + 0.2% C | 0 | 1 | 1 | 1 | — |
| 1% AM-101 + 0.2% F | 0 | 1 | 1 | 3 | — |
| 1% AM-101 + 0.2% L | 0 | 1 | 3 | 4 | 6 |
| 1% AM-101 + 0.2% M | 1 | 6 | 8 | 8 | 9 |

*AM-101 is nickel phenol-phenolate of 2,2'-thiobis(p-t-octylphenol)
C, F, L, and M are as defined below Table I, supra.

The data in Table III clearly indicate the superior resistance to thermal degradation in polypropylene of the nickel bis- complex when stabilized with hydroxyalkylamides in accordance with the present invention although some, but not all, other amides do provide useful protection.

EXAMPLE IV

The procedure of Example I was followed except that a different unstabilized polypropylene powder (Avisun) was used with 0.05 gram of the indicated amide, and some samples additionally contained 0.125 gram of a secondary stabilizer, distearylthiodipropionate, also incorporated therein. The color ratings of these samples are reported in Table IV.

Table IV

Color Rating of Polypropylene Containing 1% Nickel n-Butylamine Complex of 2,2'-Thiobis(p-t-octylphenol) Plus 0.1% of Indicated Amide

| Sample Description* | Minutes Aging at 290°C. | | | | | |
|---|---|---|---|---|---|---|
| | 2 | 5 | 7 | 10 | 13 | 15 |
| 1% NBC alone | 0 | 4 | 6 | 8 | 9 | 9 |
| 1% NBC + 0.1% B | 0 | 0 | 1 | 1 | 2 | 2 |
| 1% NBC + 0.1% R | 0 | 0 | 1 | 1 | 2 | 2 |
| 1% NBC alone with 0.25% STDP | 1 | 4 | 6 | 8 | 9 | 9 |
| 1% NBC + 0.1% B with 0.25% STDP | 0 | 0 | 0 | 0 | 2 | 5 |

*NBC and B are as defined below Table I, supra
R is 3,5-di-t-butyl-4-hydroxy-N,N-bis(2-hydroxyethyl)benzamide
STDP is distearyl thiodipropionate The data in Table IV clearly indicate the superior resistance to thermal degradation in polypropylene of the nickel amine complex when stabilized with hydroxyalkylamides in accordance with this invention whether a secondary stabilizer, distearyl thiodipropionate, is present or absent.

What is claimed is:

1. A polymer subject to degradation on exposure to ultraviolet radiation stabilized against degradation on exposure to ultraviolet radiation by an effective amount of a nickel amine, nickel aquo, or nickel bis-complex of 2,2'-thiobis(p-alkylphenol) wherein each alkyl group has up to 18 carbon atoms and further stabilized against thermal degradation of said complex on exposure to heat by an effective amount of a hydroxyalkylamide of the formula

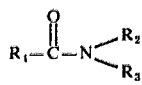

wherein $R_1$ is alkyl or aryl; $R_2$ is hydroxyalkyl of 2 to 4 carbon atoms; and $R_3$ is hydrogen or hydroxyalkyl of 2 to 4 carbon atoms.

2. A polymer composition as defined in claim 1 wherein said complex has the formula:

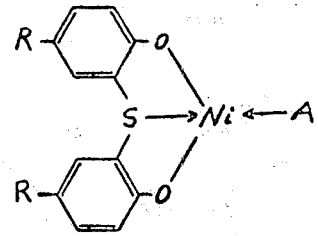

or

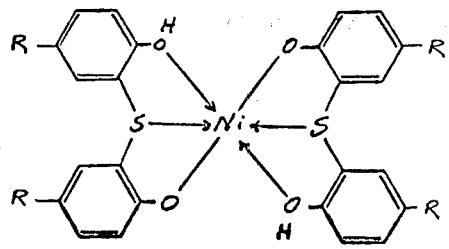

wherein each R is an alkyl group of 1 to 18 carbon atoms and A is a member selected from the group consisting of primary aliphatic amines, primary aromatic amines, cyclic secondary amines, and water.

3. A polymer composition as defined in claim 1 wherein $R_2$ is 2-hydroxyethyl and $R_3$ is hydrogen or 2-hydroxyethyl.

4. A polymer composition as defined in claim 1 wherein said complex is a nickel amine complex.

5. A polymer composition as defined in claim 1 wherein said complex is present in a concentration between about 0.01 percent and about 5 percent on weight of polymer and said hydroxyalkylamide is present in a concentration between about 5 percent and about 100 percent on weight of said complex.

6. A polymer composition as defined in claim 1 wherein said polymer is a polyolefin.

7. A stabilizer composition comprising, in combination, a nickel amine, nickel aquo, or nickel bis- complex of 2,2'-thiobis(p-alkylphenol) wherein each alkyl group has up to 18 carbon atoms and about 5 percent to about 100 percent on weight of said complex of a hydroxyalkylamide of the formula:

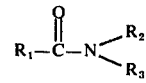

wherein $R_1$ is alkyl or aryl; $R_2$ is hydroxyalkyl of 2 to 4 carbon atoms; and $R_3$ is hydrogen or hydroxyalkyl of 2 to 4 carbon atoms.

8. A stabilizer composition as defined in claim 7 wherein said complex has the formula:

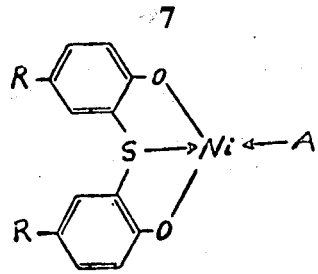

or

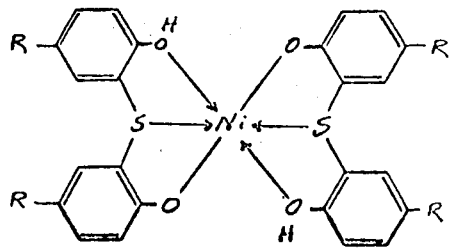

wherein each R is an alkyl group of 1 to 18 carbon atoms and A is a member selected from the group consisting of primary aliphatic amines, primary aromatic amines, cyclic secondary amines, and water.

9. A stabilizer composition as defined in claim 7 wherein $R_2$ is 2-hydroxyethyl and $R_3$ is hydrogen or 2-hydroxyethyl.

10. A stabilizer composition as defined in claim 7 wherein said complex is a nickel amine complex.

11. In a process for stabilizing a polymer against degradation on exposure to ultraviolet light by incorporating therein an effective amount of nickel amine, nickel aquo, or nickel bis- complex, the improvement comprising stabilizing said complex against thermal degradation on exposure to heat by incorporating therein an effective amount of a hydroxyalkylamide of the formula:

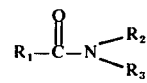

wherein $R_1$ is alkyl or aryl; $R_2$ is hydroxyalkyl of 2 to 4 carbon atoms; and $R_3$ is hydrogen or hydroxyalkyl of 2 to 4 carbon atoms.

* * * * *